3,143,538
POLYMERIZATION OF PIPERYLENE
James J. Robertson, Akron, Ohio, assignor to The Firestone Tire & Rubber Company, Akron, Ohio, a corporation of Ohio
No Drawing. Filed May 15, 1961, Ser. No. 109,803
7 Claims. (Cl. 260—94.3)

This invention relates to the polymerization of piperylene and other monomers with a three-component catalyst. The catalyst is made from a hydrocarbon lithium, a hydrocarbon aluminum compound, and a trihalide of a metal of Group III of the Periodic Table.

An advantage of this three-component catalyst is the speed with which it polymerizes various monomers. On certain monomers as, for example, isobutylene, it reacts with explosive violence. Although piperylene is polymerized only slowly with other diolefin catalysts, it is rapidly polymerized by the catalysts of the invention. The microstructure of the new polypiperylene is shown by infrared analysis to be substantially entirely 1,4-addition.

Suitable hydrocarbon lithiums are for instance alkyllithium compounds such as methyllithium, ethyllithium, butyllithium, amyllithium, hexyllithium, 2-ethylhexyllithium and n-hexadecyllithium. In addition to the saturated aliphatic lithium compounds, unsaturated compounds are also suitable such as allyllithium, methallyllithium and the like. Aryl-, alkaryl- and aralkyllithium compounds such as phenyllithium, the several tolyl- and xylyl-lithiums, alpha- and beta-naphthyl lithium and the like are also suitable. Mixtures of the various hydrocarbon lithium compounds are also suitable. For instance, a catalyst can be prepared by reacting an initial hydrocarbon lithium compound successively with an alcohol and with an olefin such as propylene (i.e., a technique analogous to the "Alfin" technique) whereby a greater or lesser proportion of the lithium from the initial hydrocarbon goes to form a lithium alkoxide and to form a new organolithium compound with the olefin. Additional hydrocarbon lithium compounds are the hydrocarbon polylithium compounds such as for instance any hydrocarbon containing from 1 to about 40 carbon atoms in which lithium has replaced a plurality of hydrogen atoms. Illustrations of suitable hydrocarbon polylithium compounds are alkylenedilithium compounds such as methylenedilithium, ethylenedilithium, trimethylenedilithium, pentamethylenedilithium, hexamethylenedilithium, decamethylenedilithium, octadecamethylenedilithium and 1,2-dilithiumpropane. Other suitable polylithium hydrocarbons are polylithium-aryl, -aralkyl and-alkaryl compounds such as 1,4-dilithiumbenzene, 1,5-dilithiumnaphthalene, 1,2-dilithium-1,3-diphenylpropane, and the like. Tri- and higher lithium hydrocarbons are also suitable, such as 1,3,5-trilithiumpentane or 1,3,5-trilithiumbenzene. Other compounds include the various lithium hydrocarbon amides. Likewise, there may be employed the lithium-polynuclear aromatic hydrocarbon adducts produced by simply reacting lithium metal with naphthalene, anthracene, biphenyl, and the like polynuclear aromatic hydrocarbons. The hydrocarbon acquires a negative charge without losing any of its hydrogens, and serves as the anion (the lithium losing an electron to serve as the cation) of the salt.

The hydrocarbon aluminum compounds include trialkylaluminums of 1 to 6 carbon atoms such as trimethylaluminum, triethylaluminum, trihexylaluminum, dibutylaluminum, trioctylaluminum and phenyldibutylaluminum; and the corresponding unsaturated compounds, viz. trialkenylaluminums of 1 to 6 carbon atoms such as triallylaluminum, tributenylaluminum, tripentenylaluminum, trihexenylaluminum, tribenzylaluminum and styryldimethylaluminum; also both alkyl and dialkyl (methyl, propyl, butyl, isobutyl, sec-butyl, decyl, heptyl, octyl, nonyl, pentyl and hexyl) mono- and dihalides and both alkenyl and dialkenyl (e.g., allyl, butenyl, pentenyl and hexenyl) mono- and dihalides having the general formula Hydrocarbon$_x$AlX$_y$ in which X is halogen (chlorine, bromine or iodine) and $x$ and $y$ are whole numbers that total 3, such as $CH_3AlCl_2$, phenylbutylaluminum bromide, ethylaluminum bromochloride, $C_3H_5AlCl_2$, $C_6H_{13}AlCl_2$, $(C_2H_5)_2AlCl$, $(C_4H_9)_2AlCl$, $(C_5H_9)_2AlCl$, etc. In any of these halides, the hydrocarbon groups can be the same or different.

The halides of the Group III metals include the trihalides of boron, aluminum, and other metals of Group III of the Periodic Table. The trichlorides are preferred, but the tribromides, triiodides and mixed halides (e.g., bromodichlorides, bromochloroiodides) and salts of 2 or more metals of Group III can be used.

The catalyst of the invention is made by first mixing the hydrocarbon lithium with the halide of a Group III metal to produce a reaction product. This step is conveniently carried out in an inert solvent, such as an alkane or cycloalkane. Then the hydrocarbon aluminum compound is added. Either or both mixing steps can be done at room temperature or at any convenient temperature, such as any temperature in the range of $-100°$ C. to $250°$ C. The ratio of hydrocarbon lithium to the halide of a Group III metal to the hydrocarbon aluminum compound is in the molar ratio of 0.1 to 5/0.1 to 5/0.1 to 5. Any operable level of catalyst can be used, such as 0.001 to 5 percent of the weight of monomer.

In addition to piperylene (which can be cis-piperylene, trans-piperylene or a mixture) other ethylenically unsaturated monomers can be polymerized by the catalyst of the invention. Other conjugated diolefins contemplated are butadiene-1,3, isoprene and 2,3-dimethylbutadiene-1,3 and various copolymers of these with or without piperylene. Alpha olefins can be polymerized by the catalyst of the invention, including styrene, methylstyrene, vinyltoluene, isobutylene, and the like. Copolymers of any of the above monomers can be made in accordance with the invention. Other monomers can be substituted for any of the above, including methylmethacrylate and other known acrylates and methacrylates, acrylonitrile and methacrylonitrile, and other known ethylenically unsaturated monomers.

The polymerization is carried out in any hydrocarbon solvent for the monomer, such as pentane, heptane, octane, hexane, petroleum ether, benzene, toluene, a xylene, or any other inert solvent for the monomer which is liquid at the temperature of the reaction. A mixture of solvents, e.g., commercial xylene and pentane, can be used. Also, excess piperylene can be used as solvent. The temperature of the polymerization can vary from $-100°$ C. to $250°$ C., although the range of $-35°$ C. to $100°$ C. is usually preferred.

Piperylene, which is a by-product of isoprene, usually contains as impurities cyclopentadiene and isopropenyl acetylene, which are generally considered polymerization inhibitors and are often removed from the raw material before polymerization as, for example, by reaction with maleic anhydride to remove the cyclopentadiene, and by admixture with a reagent containing cuprous ions to remove the isopropenyl acetylene. For polymerization in the system to which this invention relates, the piperylene was not chemically freed from these inhibitors, but commercial piperylene, once distilled, was employed. Removal of cyclopentadiene and alpha acetylenes makes possible the preparation of a polymer of greater molecular weight.

More active catalyst systems of the invention are produced in the presence of some ethylenically unsaturated monomer. The monomer is usually the one to be polymerized by the completed catalyst, but not necessarily. The monomer can be added at the time the hydrocarbon lithium is mixed with the Group III halide, but is usually fully as effective if added just prior to the addition of the hydrocarbon aluminum compound. As this activation of the catalyst system by monomer appears to be catalytic, even a very small amount added before reaction of the aluminum compound with the intermediate catalyst reaction product is effective. For example, 0.1 molar proportion of monomer is enough to activate a system containing 0.1 to 5 molar proportions of the catalyst.

The polymerization is carried out in the absence of air, conveniently accomplished by drying the reaction vessel in hot oven and then charging the vessel while hot, utilizing the heat of the reaction vessel to volatilize sufficient solvent to flush all air from the vessel. The reaction vessel is then sealed and agitated as by being turned end-over-end or rotated in a polymerization bath. The polymerization is carried to a desirable percentage conversion. The polymerization time in Example 1 (below) was 5 minutes and in each of Examples 2 and 3 (below) it was overnight (i.e., 16 hours between the start and the next observation, at which time polymerization had been completed or was interrupted). The product can be used where polypiperylenes are used and generally wherever rubbery polypentadienes have been employed, as, for example, for extending rubbers in rubber compounding, and the production of vulcanizates for tires, etc., and in reaction products as in chlorination to produce a substitute for chlorinated rubber.

The invention is illustrated by the following examples, in which all parts and percentages are by weight.

Examples 1–3

The conditions of the polymerizations, and the nature of the polymer products are summarized in the following table:

|  | Example 1 | Example 2 | Example 3 |
|---|---|---|---|
| Piperylene, g | 100 | 100 | 100 |
| Hexane, g | 200 | 200 | 600 |
| Ethyllithium, mmoles | 4.0 | 2.0 | 2.0 |
| $BCl_3$, mmoles | 4.0 | 2.0 | 2.0 |
| Al hexyl$_3$, mmoles | 2.0 | 2.0 | 4.0 |
| Ratio, Li/B/Al | 1/1/0.5 | 1/1/1 | 1/1/2 |
| g. Catalyst | 1.18 | 0.87 | 1.43 |
| Temp., °C | 12 | 30 | RT |
| Percent Conversion | 50 | 40 | 100 |
| Polymer, m.wt | cross-linked | soluble low mol. wt. | soluble low mol. wt. |

The table indicates the amount of the various catalyst components in millimoles. The temperatures employed, proportions used, and solvents utilized are illustrative. In Example 1 the conditions were such as to produce gelling, evidencing the production of a cross-linked polymer. The polymers of Examples 2 and 3 were soluble.

The rubbery polypiperylene of the invention is substantially entirely of 1,4-addition structure, and is at least 95 percent 1,4-addition structure, as measured by known infrared technique.

What is claimed is:
1. The method of making a polymer in an inert solvent, in which method the polypiperylene produced is substantially entirely of 1,4-addition configuration, from monomer which includes at least a substantial amount of piperylene, which method comprises admixing a hydrocarbon lithium with a trihalide of a metal of Group III of the Periodic Table in the presence of some monomer, mixing the resulting product and monomer to be polymerized with a hydrocarbon aluminum compound of the formula

$$Hydrocarbon_x AlHalogen_y$$

in which there is at least some hydrocarbon and the sum of $x$ and $y$ is 3, said hydrocarbon being selected from the group consisting of alkyl groups, alkenyl groups, aralkyl groups and phenyl; the hydrocarbon lithium, the trihalide and the hydrocarbon aluminum compound being present in the molar ratio of 0.1 to 5/0.1 to 5/0.1 to 5, and polymerizing the monomer at a temperature of −100 to 250° C., the catalyst concentration being 0.001 to 5 percent of the weight of the monomer.

2. The process of claim 1 in which the monomer is essentially piperylene.

3. The process of claim 1 in which the trihalide is boron trichloride.

4. The process of claim 1 in which the hydrocarbon lithium is an alkyl lithium in which the alkyl group contains 1 to 6 carbon atoms.

5. The process of claim 1 in which the monomer is essentially piperylene, the trihalide is boron trichloride and the molar ratio is substantially 1/1/1.

6. The process of polymerizing piperylene which comprises dissolving the piperylene in a hydrocarbon which is both liquid and a solvent for the monomer and the polymer at the temperature employed, with 0.1 to 2 parts of three-component catalyst per 100 parts by weight of the piperylene at a temperature of −35° C. to 70° C., said catalyst consisting of ethyllithium, boron trichloride and trihexyl aluminum in the molar ratio of 0.1 to 5/0.1 to 5/0.1 to 5, the ethyllithium being added to the boron trichloride in the presence of the monomer, and the trihexyl aluminum being added to this, and thereby producing polypiperylene which is substantially entirely of 1,4-addition configuration.

7. The process of claim 6 in which the molar ratio is substantially 1/1/1.

References Cited in the file of this patent
UNITED STATES PATENTS

| 2,899,415 | Truett | Aug. 11, 1959 |
| 2,905,659 | Miller et al. | Sept. 22, 1959 |
| 2,931,791 | Ernst et al. | Apr. 5, 1960 |

FOREIGN PATENTS

| 457,699 | Belgium | May 9, 1956 |
| 223,817 | Australia | Sept. 11, 1959 |

OTHER REFERENCES

Gaylord et al.: Linear and Stereoregular Addition Polymers, June 18, 1959, page 402.

UNITED STATES PATENT OFFICE
CERTIFICATE OF CORRECTION

Patent No. 3,143,538 August 4, 1964

James J. Robertson

It is hereby certified that error appears in the above numbered patent requiring correction and that the said Letters Patent should read as corrected below.

Column 1, lines 66 and 67, for "dibutylaluminum" read -- dibutylhexylaluminum --; column 4, line 55, for "457,699" read -- 547,699 --.

Signed and sealed this 12th day of January 1965.

(SEAL)
Attest:

ERNEST W. SWIDER
Attesting Officer

EDWARD J. BRENNER
Commissioner of Patents